3,462,317
THERMOCOUPLE ASSEMBLY
James R. Baum, Scottsdale, and Raymond J. Jimenez, Phoenix, Ariz., assignors to Motorola, Inc., Franklin Park, Ill., a corporation of Illinois
Filed Oct. 12, 1965, Ser. No. 495,158
Int. Cl. H01v 1/02
U.S. Cl. 136—230                3 Claims This invention relates to a thermocouple for measurement of the temperature of semiconductor or integrated circuit packages.

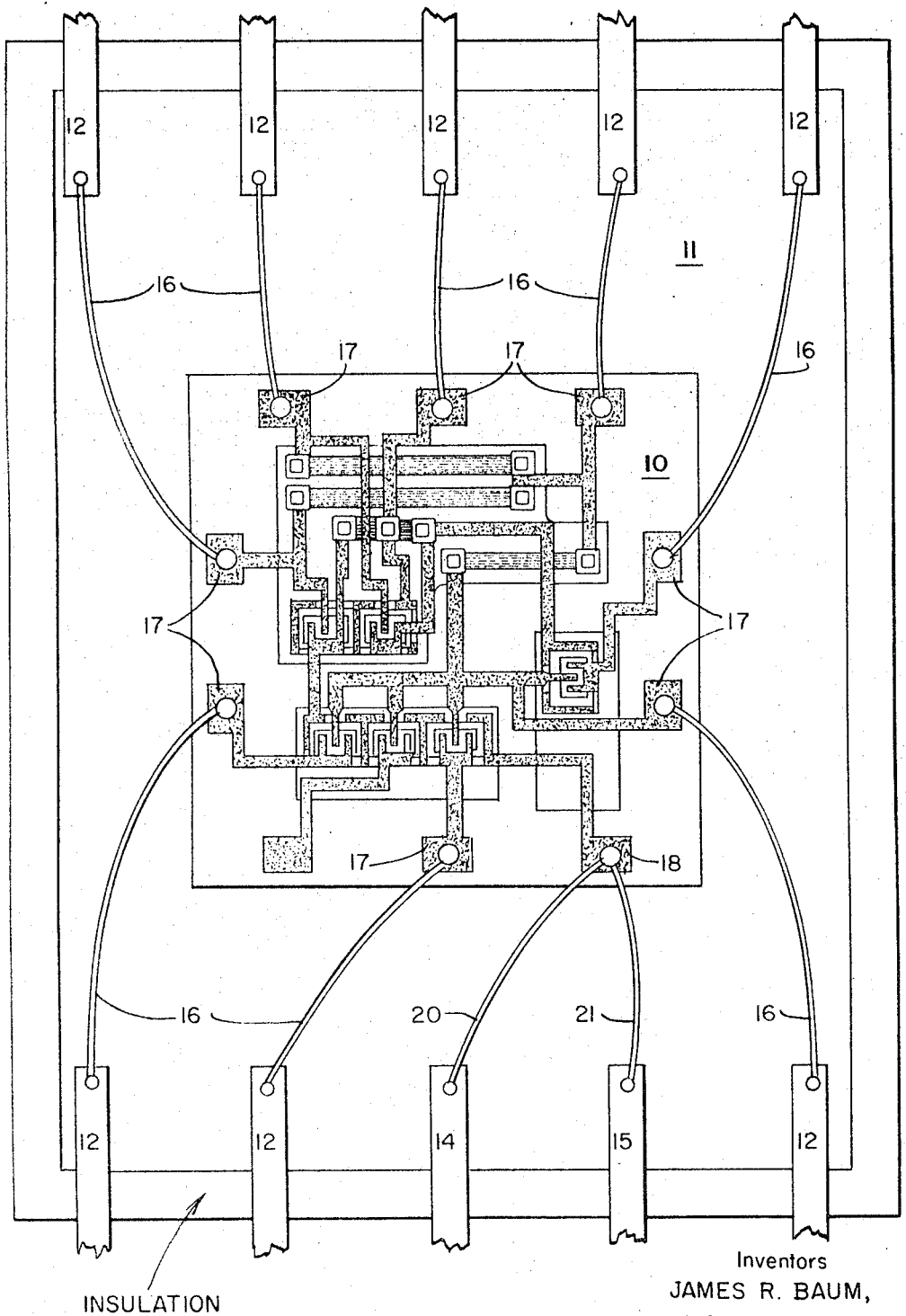

Today's discrete semiconductor devices as well as integrated circuits are packaged in containers of different shapes which effect the temperature rise of the unit. Since the variation of device characteristics with temperature is a matter of extreme importance, the temperature often has to be controlled so that the maximum allowable internal temperatures are not exceeded. Usually the ambient temperature of the package is considered, but because all the heat is dissipated by the quite localized active and resistive elements of the semiconductor device or integrated circuit, the measurement of the ambient temperature does not reproduce exactly the thermal situation of the active or resistive elements.

Accordingly, it is an object of the present invention to provide a temperature measuring device for a semiconductor or an integrated circuit package.

A further object of the invention is to provide a temperature sensor for the die of the semiconductor device or the integrated circuit.

A feature of the invention is the provision of a thermocouple mounted directly within the semiconductor package.

A further feature of the invention is the provision of a thermocouple, the joined end of which is connected to the active element and the free ends of which are connected to leads of the package.

The invention is illustrated in the drawing in which an unsealed open flat package is shown with a thermocouple according to the invention.

In brief, the present invention may be utilized advantageously for measurement of temperature within a semiconductor package. The semiconductor unit is positioned in the package. The leads of the package generally are connected through contact wires to the bonding islands. For providing a thermocouple within the package one bonding island is connected to the joined end of the thermocouple whereas its free ends are connected separately to leads of the package. After the package has been sealed the thermocouple voltage can be read directly from the appropriate leads.

In the figure an embodiment of the invention is shown. An integrated circuit semiconductor unit 10 is illustrated mounted on a ten lead mounting base 11, which is not yet sealed by a cover. The lead mounting base 11 and the not shown cover are made of an insulating material such as a ceramic or a glass, and when the two parts are sealed the hermetic enclosure formed serves to keep the semiconductor unit from contact with the outside atmosphere. Connection to the semiconductor unit 10 is made through the mounting base by leads 12, 14 and 15 and finally from the leads 12 to the semiconductor unit 10 with thin aluminum wires 16 bonded to the leads 12 and to metal contact pads 17 on the semiconductor unit 10.

There are two further leads 14 and 15 which are connected to a common pad 18 of the metal contacts through wires 20 and 21. The wires 20 and 21 consist of materials which are suitable to provide a thermocouple sensor, such as copper and constantan. The two wires 20 and 21 are welded together at one end and bonded to the pad 18. The other end of the two wires are separately connected to the leads 14 and 15.

This invention allows one or several thermocouples to be mounted directly onto a semiconductor device or an integrated circuit. A further advantage is that one of the wires of the thermocouple can be used for a circuit connection when the thermocouple is not connected as a sensor so that only one additional pin is needed for each thermocouple. The temperature sensor can be incorporated during fabrication of thermally critical devices and then be sealed in known manner. The thermocouple voltage is read directly from the appropriate pins. Because of the effect of the pin material used with the thermocouple unit, a correction procedure will be required.

We claim:

1. A thermocouple for measurement of the temperature of a semiconductor device including in combination, a semiconductor unit mounted in a package having leads connected to said package, a thermocouple having a joined end and two free ends and coupled with said joined end to said semiconductor unit and with said two free ends to said corresponding leads, said package being sealed providing said thermocouple within said package.

2. A thermocouple for measurement of the temperature of a semiconductor device including in combination, a semiconductor unit having a metal contact ending in a bonding island, a package for receiving said semiconductor unit and leads connected to the package, a thermocouple having a joined end and two free ends, said joined end connected to said bonding island and said free ends connected to said corresponding leads, said package being sealed providing said thermocouple within said package.

3. A thermocouple for measurement of the temperature of a semiconductor device including in combination, a semiconductor unit having a circuit contact ending in a bonding island, a package for receiving said semiconductor unit and leads connected to the package, a thermocouple having two wires with a joined end and two free ends, said joined end connected to said bonding island and said free ends connected to said corresponding leads, one of said wires used for a circuit connection, said package being sealed providing said thermocouple within said package.

References Cited
UNITED STATES PATENTS
3,339,002    8/1967    Pelanne _____ 136—201 X WINSTON A. DOUGLAS, Primary Examiner MELVYN J. ANDREWS, Assistant Examiner